United States Patent
Watanabe

(10) Patent No.: US 8,149,290 B2
(45) Date of Patent: Apr. 3, 2012

(54) IMAGE PROCESSOR, IMAGING APPARATUS INCLUDING THE SAME, AND IMAGE PROCESSING METHOD, WITH BLURRING PROCESSING OF BACKGROUND IMAGE

(75) Inventor: Yoshikazu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 310 days.

(21) Appl. No.: 12/485,157

(22) Filed: Jun. 16, 2009

(65) Prior Publication Data

US 2010/0007759 A1    Jan. 14, 2010

(30) Foreign Application Priority Data

Jul. 10, 2008   (JP) ................................. 2008-179934

(51) Int. Cl.
*H04N 5/228*   (2006.01)

(52) U.S. Cl. ..................................... 348/222.1; 348/239

(58) Field of Classification Search ............... 348/222.1, 348/239, 578, 218.1; 382/173, 264, 284, 382/312, 254

See application file for complete search history.

(56) References Cited

U.S. PATENT DOCUMENTS

| | | | |
|---|---|---|---|
| 7,538,803 B2 | 5/2009 | Kurosawa | |
| 2002/0140823 A1* | 10/2002 | Sakurai et al. | 348/207.99 |
| 2003/0071905 A1* | 4/2003 | Yamasaki | 348/239 |
| 2005/0002546 A1* | 1/2005 | Florent et al. | 382/128 |
| 2005/0220358 A1* | 10/2005 | Blonde et al. | 382/264 |
| 2007/0216675 A1* | 9/2007 | Sun et al. | 345/419 |
| 2007/0286520 A1* | 12/2007 | Zhang et al. | 382/264 |
| 2008/0106615 A1* | 5/2008 | Ahonen et al. | 348/231.99 |
| 2009/0021600 A1 | 1/2009 | Watanabe | |
| 2009/0096897 A1* | 4/2009 | Saito | 348/241 |
| 2009/0136148 A1* | 5/2009 | Lim et al. | 382/255 |

FOREIGN PATENT DOCUMENTS

| | | |
|---|---|---|
| JP | 11-266388 | 9/1999 |
| JP | 2003-37767 | 2/2003 |
| JP | 2003-101858 | 4/2003 |
| JP | 4136012 | 6/2008 |
| WO | WO 2009/017138 | 2/2009 |

* cited by examiner

*Primary Examiner* — Sinh Tran
*Assistant Examiner* — Selam Gebriel
(74) *Attorney, Agent, or Firm* — Dickstein Shapiro LLP

(57) ABSTRACT

An image processor performs blurring processing on an image acquired via a lens system and including a main subject image and a background image, and includes an image processing section having a reduction rate determiner part which determines a reduction rate of the background image based on at least one of a focal length of the lens system, a distance between the main subject image and the background image, level of the blurring processing, and an image size of the background image; an image reduction part which reduces the background image at the reduction rate determined by the reduction rate determiner part; a spatial filter processing part which performs spatial filter processing on the background image reduced by the image reduction part; and an image enlargement part which enlarges the background image processed by the spatial filter processing part at an enlargement rate as an inverse of the reduction rate.

6 Claims, 12 Drawing Sheets

| 0 | 40 | 80 | 95 | 80 | 40 | 0 |
|---|---|---|---|---|---|---|
| 40 | 100 | 100 | 100 | 100 | 100 | 40 |
| 80 | 100 | 100 | 100 | 100 | 100 | 80 |
| 95 | 100 | 100 | 100 | 100 | 100 | 95 |
| 80 | 100 | 100 | 100 | 100 | 100 | 80 |
| 40 | 100 | 100 | 100 | 100 | 100 | 40 |
| 0 | 40 | 80 | 95 | 80 | 40 | 0 |

| 0 | 40 | 80 | 95 | 80 | 40 | 0 |
|---|---|---|---|---|---|---|
| 40 | 100 | 100 | 100 | 100 | 100 | 40 |
| 80 | 100 | 100 | 100 | 100 | 100 | 80 |
| 95 | 100 | 100 | 100 | 100 | 100 | 95 |
| 80 | 100 | 100 | 100 | 100 | 100 | 80 |
| 40 | 100 | 100 | 100 | 100 | 100 | 40 |
| 0 | 40 | 80 | 95 | 80 | 40 | 0 |

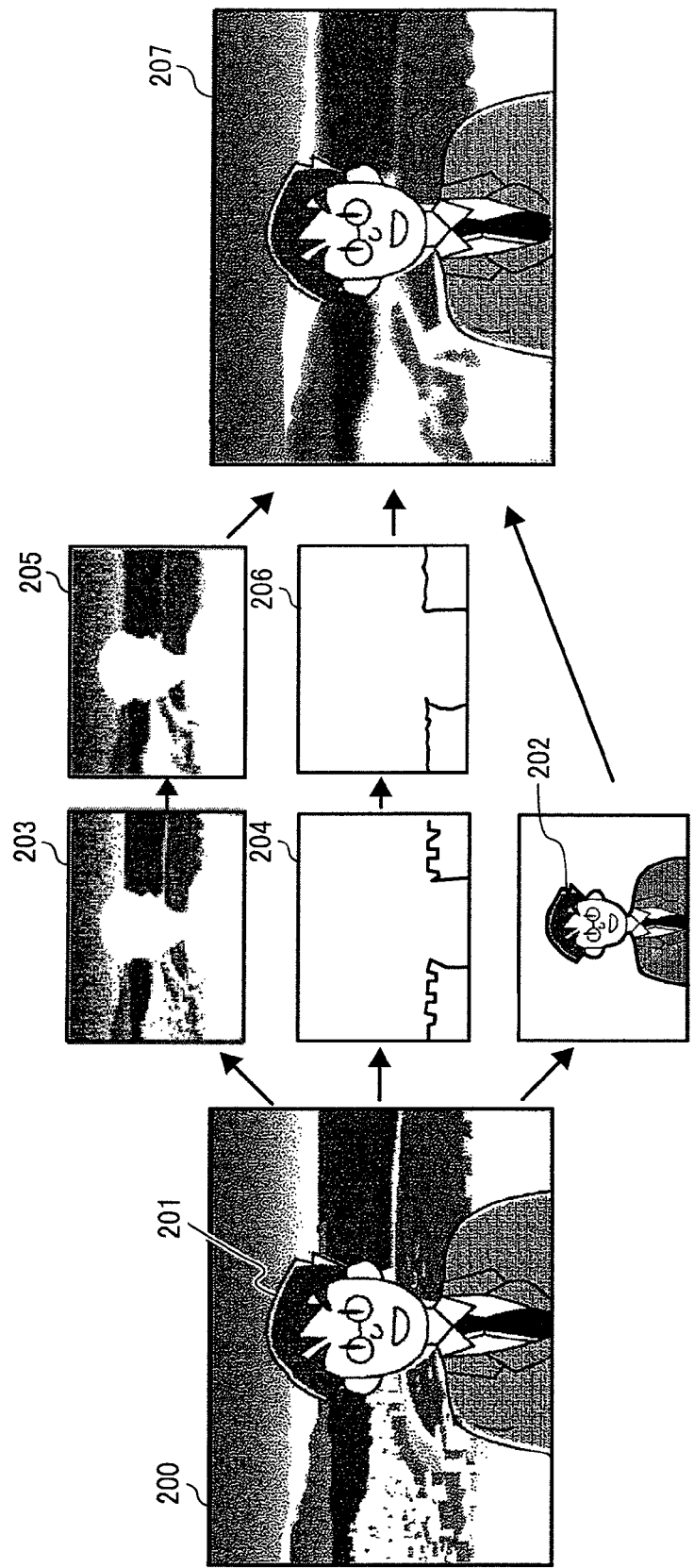

IMAGE PROCESSOR, IMAGING APPARATUS INCLUDING THE SAME, AND IMAGE PROCESSING METHOD, WITH BLURRING PROCESSING OF BACKGROUND IMAGE

CROSS REFERENCE TO RELATED APPLICATION

The present application is based on and claims priorities from Japanese Patent Application Serial Number 2008-179934, filed Jul. 10, 2008, the disclosures of which are hereby incorporated by reference herein in their entirety.

BACKGROUND OF THE INVENTION

1. Field of the Invention

The present invention relates to an image processor having an image blurring processing function and an imaging apparatus including the same, and an image processing method.

2. Description of the Prior Art

Generally, an area of an imaging device for a so-called compact digital camera is smaller than that in a single-lens reflex digital camera, or than an exposure area of a silver-salt film in a film single-lens reflex camera. Thus, in comparison of focal lengths necessary for photographing an image at the same angle of field, the compact digital camera needs a shorter focal length than the single-lens reflex digital camera or the film single-lens reflex camera. In addition, with a constant F-number, a depth of field of a photographic optical system having a shorter focal length is deeper than that of a photographic optical system having a longer focal length.

To reduce the depth of field, the F-number has to be reduced. However, in order to reduce the F-number, a lens diameter of the photographic optical system needs to be enlarged, leading to increases in size and costs thereof which is not suitable for the compact digital camera. The compact digital camera generally has a characteristic of a deep depth of field and achieves a focus in a relatively wide range. Such a characteristic is advantageous in shooting an image at even brightness to obtain an image including a background image with a small blurring effect while it is disadvantageous, for example, in portrait shooting to obtain an image with a largely blurred background since it is very difficult to obtain such an image.

In order to deal with such a problem, for example, Japanese Patent Application Publication No. Hei 11-266388, No. 2003-37767, No. 2003-101858, and Japanese Patent No. 4136012 each discloses a digital camera which can blur a background image by image processing. The cameras disclosed in the publications change a characteristic of a filter in the image processing according to a distance between a subject and the digital camera or according to a position of a subject in an angle of field, so as to realize blurring effects with perspective.

However, in order to achieve great blurring effects only by the image processing using the filter, it is needed to perform filter processing with a large number of filters of a large filter order which needs a larger-scale processing circuit. This may cause an increase in manufacture costs and a decrease in processing speed.

SUMMARY OF THE INVENTION

At least one objective of the present invention is to provide an image processor, an imaging apparatus, and an image processing method, which realize great image blurring effects through simple image processing.

To achieve these and other advantages and in accordance with the purpose of the invention, as embodied and broadly described herein, the invention provides an image processor comprising an image processing section which performs a blurring processing on an image which is acquired via a lens system and includes an image of a main subject and an image of a background, the image processing section including a reduction rate determiner part which determines a reduction rate of the background image based on at least one of a focal length of the lens system, a distance between the main subject image and the background image, a level of the blurring processing determined by a user's instruction, and an image size of the background image; an image reduction part which reduces the background image at the reduction rate determined by the reduction rate determiner part; a spatial filter processing part which performs a spatial filter processing on the background image reduced by the image reduction part; and an image enlargement part which enlarges the background image processed by the spatial filter processing part at an enlargement rate as an inverse of the reduction rate, wherein a subject of the blurring processing of the image processing section is the background image.

Preferably, in the image processor, the image further includes a subject image in a background and the background image is the subject image in a background.

Further, the invention provides an image processing method which comprises the steps of performing a blurring processing on an image which is acquired via a lens system and includes an image of a main subject and an image of a background; determining a reduction rate of the background image based on at least one of a focal length of the lens system, a distance between the main subject and the background, a level of the blurring processing determined by a user's instruction, and an image size of the background image; reducing the background image at the reduction rate determined in the reduction rate determining step; performing a spatial filter processing on the background image reduced in the image reducing step; and enlarging the background image processed in the spatial filter processing step at an enlargement rate as an inverse of the reduction rate, wherein a subject of the blurring processing is the background image.

Preferably, in the above image processing method, the image further includes a subject image in a background, and the background image is the subject image in a background.

The invention further provides an imaging apparatus which comprises the above-mentioned image processor.

BRIEF DESCRIPTION OF THE DRAWINGS

The accompanying drawings are included to provide a further understanding of the invention, and are incorporated in and constitute a part of this description. The drawings illustrate embodiments of the invention, and together with the description, serve to explain the principles of the invention.

FIG. 10B shows another example of the filter coefficients in the digital camera according to the first embodiment.

FIG. 10C shows yet another example of the filter coefficients in the digital camera according to the first embodiment.

FIG. 11 shows image processing of a digital camera according to a second embodiment.

DETAILED DESCRIPTION OF THE PREFERRED EMBODIMENTS

Figure 1:
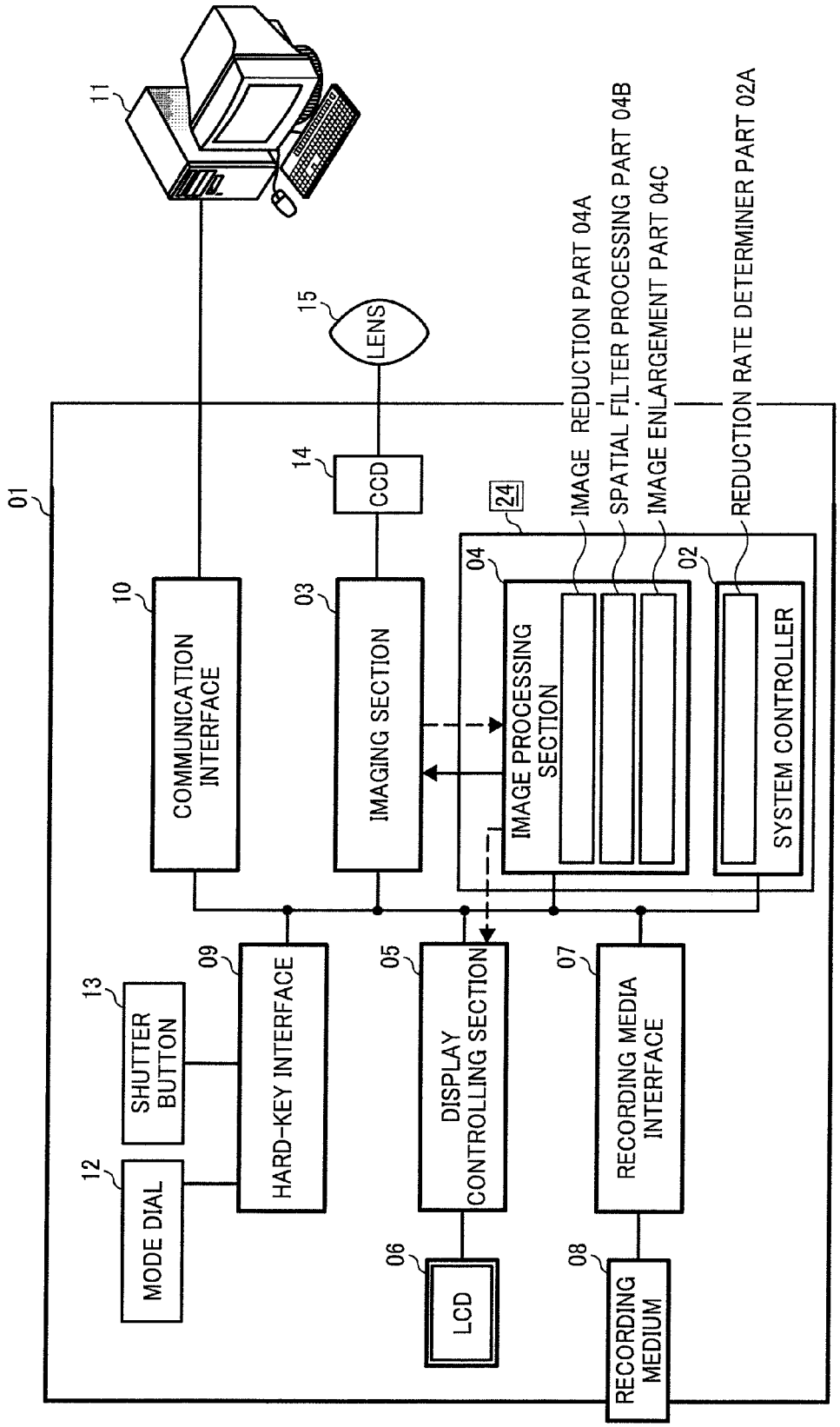
FIG. 1 is a block diagram of a digital camera according to a first embodiment of the present invention.

The preferred embodiments of the present invention will be described in detail with reference to the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

First Embodiment

FIG. 1 schematically illustrates a structure of a digital camera (imaging apparatus) 01 and a connected device according to a first embodiment of the present invention.

The digital camera 01 includes a system controller 02, and an imaging section 03. The system controller 02 comprises, for example, a CPU (Central Processing Unit), a NAND flash memory, a SDRAM (Synchronous Dynamic Random Access Memory), and a timer, to control the overall operation of the digital camera 01. The imaging section 03 comprises, for example, a motor driving an optical imaging system, a CCD driving circuit for driving a CCD (Charge-Coupled Device) 14, and an A/D (Analog/Digital) converter.

The digital camera 01 includes an image processing section 04 which applies various image processings to an image signal obtained by the imaging section 03. The image processing section 04 comprises, for example, an image processing DSP (Digital Signal Processor) and a RAM (Random Access Memory). The image processing DSP, for example, controls CCD drive timing of the imaging section 03 and a lens drive motor to make zoom, focus, and exposure adjustments as well as to compress/expand an image.

The digital camera 01 also includes a display controlling section 05 which performs signal processing on the image signal processed by the image processing section 04 to display it on an LCD (Liquid Crystal Display) 06. The display controlling section 05 generates various graphic images for a user-interface. The display controlling section 05 comprises, for example, a D/A (Digital/Analog) converter which converts the generated graphic images into digital signals for display, and an on-screen display controller.

The LCD 06 displays captured images and the graphic images for the user-interface. The digital camera 01 includes a recording media interface 07 and a recording medium 08. The recording media interface 07 includes, for example, a memory card controller for interface with the recording medium 08. The recording medium 08 is detachable from the digital camera 01 and includes, for example, a flash memory for storing therein a compressed image signal and various kinds of information on an image.

The digital camera 01 further includes a hard-key interface 09, and a communication interface 10. The hard-key interface 09 detects states of user-interface members such as keys and a dial. The hard-key interface 09 is provided, for example, with a sub-CPU for controlling a main power supply for a main CPU. The communication interface 10 is provided, for example, with a communication controller for data communication, and a USB (Universal Serial Bus) connector for establishing connection with an external device. In the present embodiment, a personal computer 11 is connected with the communication interface 10 through a USB connection, although it is not limited thereto. The personal computer 11 receives the image captured by the digital camera for reproduction, and performs various settings of the digital camera 01.

The digital camera 01 also includes a mode dial 12 for setting shooting modes, a shutter button 13, a lens 15 focusing an optical image of a subject on the CCD 14, and the CCD 14 as an imaging device for converting the optical image of the subject into an electrical signal.

Figure 2:
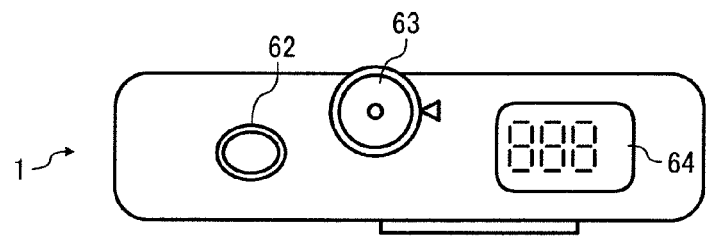
FIG. 2 is a top view of the digital camera according to the first embodiment.
Figure 3:
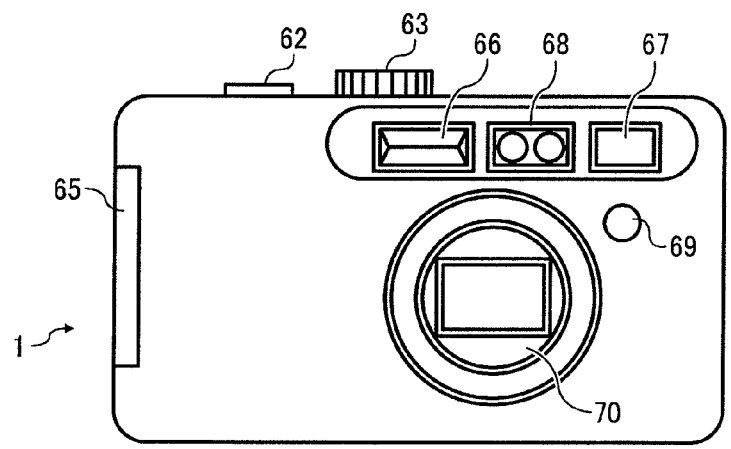
FIG. 3 is a front view of the digital camera according to the first embodiment.
Figure 4:
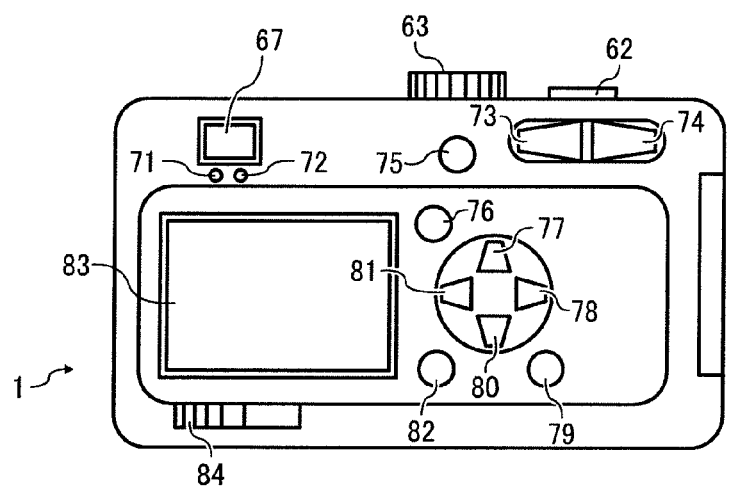
FIG. 4 is a back view of the digital camera according to the first embodiment.

FIGS. 2 to 4 are a top view, a front view, and a back view of the digital camera 01 according to the first embodiment, respectively.

In FIG. 2, the digital camera 01 includes a shutter button 62 (shutter button 13 in FIG. 1), a mode dial 63 (mode dial 12 in FIG. 1), and a sub-LCD 64 on a top surface.

On a front surface in FIG. 3, an SD card and battery lid 65, a strobe emitting section 66, an optical finder 67, a ranging unit 68, a remote controller light-receiver 69, and a lens barrel unit 70 are provided.

On a back surface in FIG. 4 provided are an AF (Auto Focus) LED (Light-Emitting Device) 71, a strobe LED 72, a zoom switch for wide angle 73, a zoom switch for telephoto 74, a self-timer and delete switch 75, a menu switch 76, an upward movement and strobe switch 77, a rightward movement switch 78, a display switch 79, a downward movement and strobe switch 80, a leftward movement and image checkup switch 81, an OK switch 82, an LCD monitor 83, a power switch 84, and an optical finder 67. The optical finder 67 is inserted from the front surface to the back surface of the digital camera 01.

Now, basic operation of activation of the digital camera 01 according to the present embodiment will be described. The hard-key interface 09 initiates power supply to the main CPU when a user operates the power switch 84. The main CPU within the system controller 02 first accesses (or executes programs) a boot section of the NAND flash memory, and transfers programs and data to the SDRAM by a boot program. Upon completion of the programs and data transfer to the SDRAM, the main CPU moves program execution pointers or program counters to the programs transferred on the SDRAM which thereafter starts activation processing.

The activation processing includes, for example, initialization of an OS (Operating System), an extension of the lens barrel 70, and an initialization processing of the recording medium 08. The lens barrel 70 may be extended by applying a pulse signal to the motor of the imaging section 03 with each predetermined interval (2 mS, for example) via the image processing section 04. The recording medium 08 is initialized by issuing an initialization command to the recording medium 08 after supply of power and clocks via the recording media interface 07. The actual initialization processing is performed within the recording medium 08. The system controller 02 checks a status of the recording medium 08 by polling with an interval of 10 mS, for example, in order to detect completion of the initialization of the recording medium 08.

Next, shooting operation will be described. Prior to photographing, a user operates the various kinds of keys, switches, and dials illustrated in FIGS. 2 to 4 so as to select a shooting mode such as a high image quality mode, a low image quality mode, and so on. The user's operation is determined by the system controller 02 through the hard-key interface 09. The system controller 02 generates guidance graphics according to the operation of the user and outputs them to the display controller 05, to give guidance to the user for subsequent operation. The system controller 02 sets process parameters to the image processing section 04 in accordance with the determined shooting mode.

Further, the user may operate the zoom switches 73 and 74 to decide an angle of field or picture composition, and the system controller 02 determines the user's operation through the hard-key interface 09, and controls the imaging section 03 to drive the lens 15 in accordance with the user's operation. The imaging section 03, before shooting, initiates an imaging operation for displaying a live view image on the LCD 06 under the control of the image processing section 04.

Image data captured by the imaging section 03 are continuously transmitted to the image processing section 04. The image processing section 04 applies image processing such as color space conversion, gamma correction, and white balance adjustment to the image data, and then transmits the processed image data to the display controlling section 05. The display controlling section 05 performs a signal processing on the image data and outputs it to the LCD 06 to show a state of imaging to the user as a live view. When the user presses the shutter button 62, the system controller 02 determines through the hard-key interface 09 what the user intends to execute.

Then, the imaging section 03 focuses under the control of the image processing section 04, and transmits the image captured by the CCD 14 to the image processing section 04. The image processing section 04 performs the image processing and compression processing according to the set shooting mode. The system controller 02 reads the compressed image data from the image processing section 04, adds header information thereto, and then writes the image data on the recording medium 08 through the recording media interface 07. Thereby, a series of shooting operation is completed.

Figure 5A:
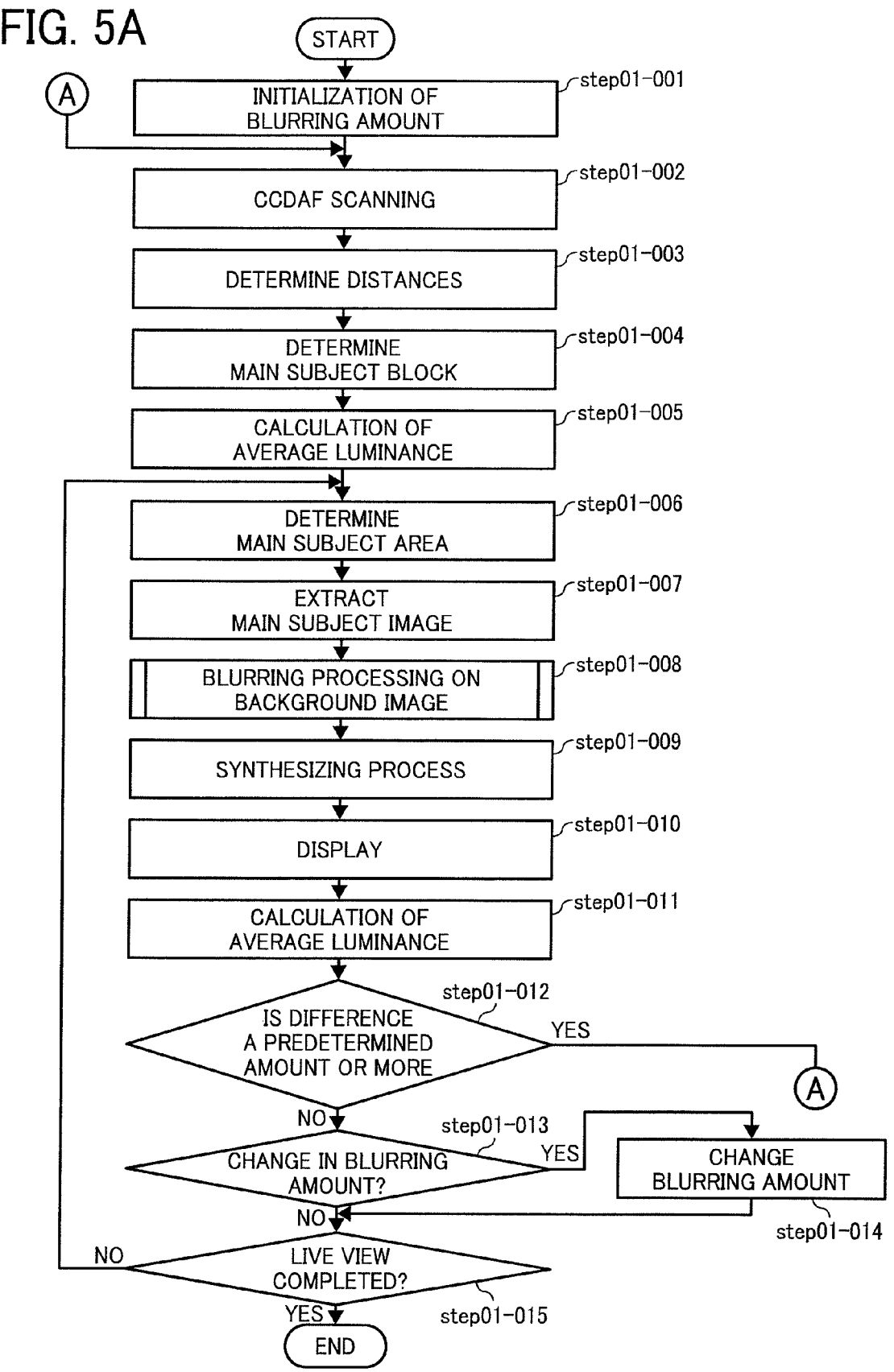
FIG. 5A is a flowchart for operation of the digital camera according to the first embodiment.

Now, a blurring processing according to the present embodiment will be described. The blurring processing is to change an amount of blurring in a background portion of an image in accordance with a blurring level selected by the user. FIG. 5A is a flowchart for the blurring processing during a live view of a subject according to the first embodiment.

Upon start of viewing the subject, the system controller 02 sets a blurring amount parameter (described later) to an initial value of 5, for example (step 01-001). Then, the system controller 02 controls the image processing section 04 and the imaging section 03 to perform a later-described CCDAF scanning operation (step 01-002). Thereafter, the system controller 02 determines a distance to each position in the image (step 01-003).

Here, the CCDAF operation is briefly described. Generally, an electronic imaging apparatus having a two-dimensional imaging device such as a digital camera or a video camera, detects contrast of a screen on the basis of a picture signal photo-electrically converted by the imaging device, and makes focal point adjustment by controlling a position of a focus lens to attain the maximum contrast on the screen. Normally, the contrast is small in out-of-focus state. The value of contrast increases as the lens is brought into focus, and it reaches the maximum value when the lens is brought into complete focus.

The CCDAF scanning operation refers to capturing a subject image at plural positions while gradually moving a position of the focus lens from an infinite end to a proximate end and determining, as a focus position, a position of the focus lens at which an image having the highest contrast among the captured plural images is captured.

Figure 6A:
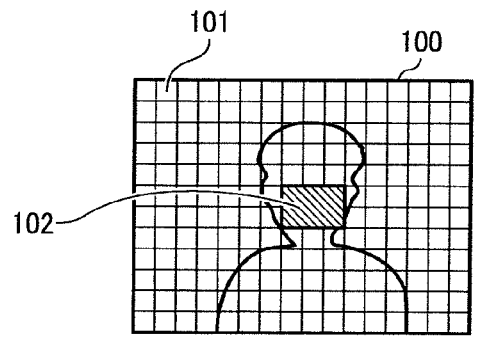
FIG. 6A shows image processing of the digital camera according to the first embodiment.

Next, the CCDAF scanning operation will be described with reference to FIGS. 6A to 6D. In FIG. 6A, reference numeral 100 denotes a shooting area for a live view image, and reference numeral 101 denotes one area for an AF (Auto Focus) evaluation value or an AF evaluation value area. Referring to FIG. 6A, the AF evaluation value areas are small evenly divided areas in the shooting area. Through the CCDAF scanning operation, the AF evaluation value of each of the areas, i.e., an integration value of contrast of the image in the areas is obtained. The system controller 02 analyzes, for each of the areas, by a predetermined algorithm, the AF evaluation value at each of the lens positions obtained in the CCDAF scanning operation to determine the position of the focus lens where the AF evaluation value is to reach its peak. In addition, the system controller 02 calculates, for each of the areas, distance information between the subject and the digital camera 01 on the basis of drive positions of the focus lens.

Figure 6D:
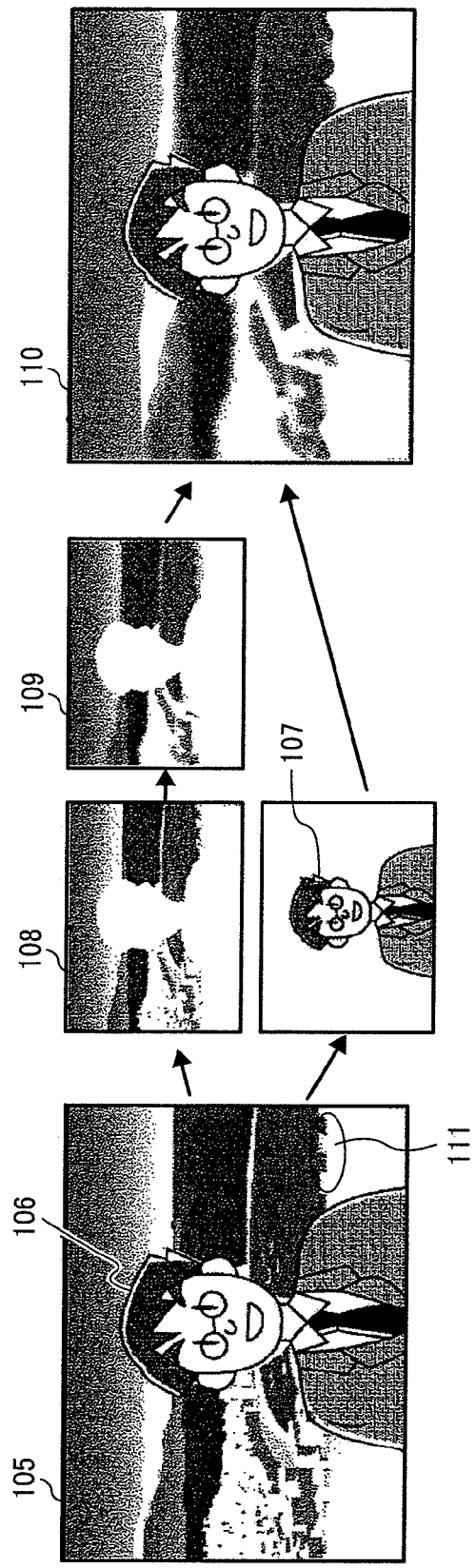
FIG. 6D shows yet another image processing of the digital camera according to the first embodiment.
Figure 7:
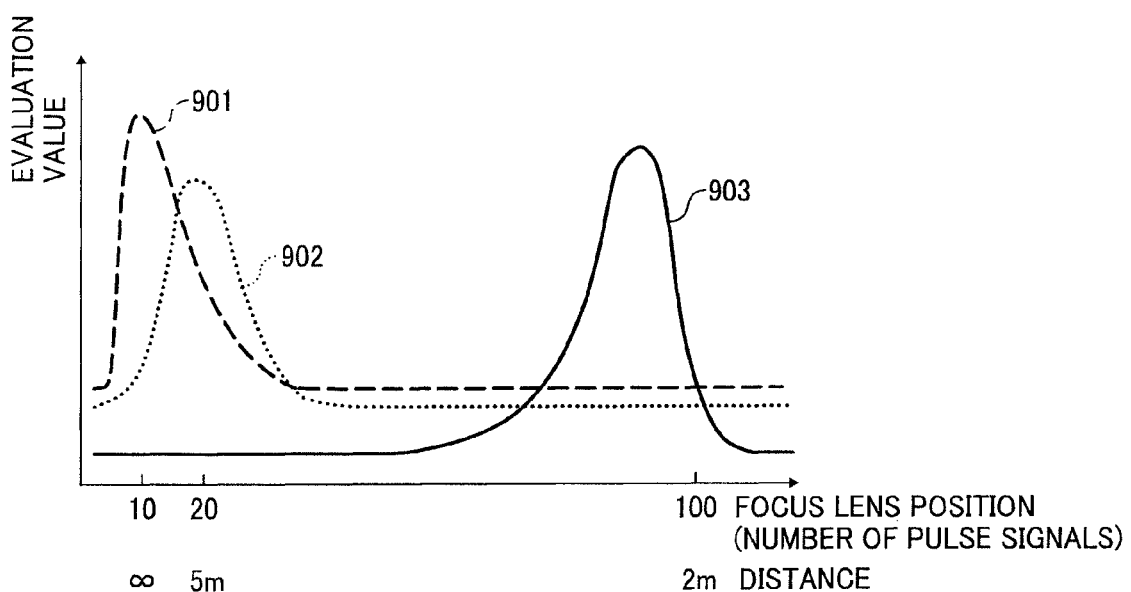
FIG. 7 shows a relationship between an AF (Auto Focus) evaluation value and a subject distance in the digital camera according to the first embodiment.

FIG. 7 illustrates one example of a relationship between positions of the focus lens, i.e., focal length, and the AF evaluation values in the CCDAF scanning operation according to the first embodiment. Referring to FIG. 7, a horizontal axis represents the focus lens position and the focal length corresponding to the focus lens position, and a vertical axis represents the AF evaluation value. A curved line 901 represents a change in the AF evaluation value in the CCDAF scanning operation relative to a subject in a long distance such as a mountain portion 105 in the background of an image in FIG. 6D. A curved line 902 represents a change in the AF evaluation value in the CCDAF scanning operation relative to a subject in a middle distance such as a curbstone 111 in the background 105 in FIG. 6D. Similarly, a curved line 903 represents a change in the AF evaluation value in the CCDAF scanning operation relative to a subject in a short distance such as a person in FIG. 6D.

Here, the AF evaluation value is obtained by performing HPF (High Pass Filter) calculation between pixels in a horizontal direction of the AF evaluation value area and adding resultant high frequency components to each pixel. In the present embodiment, coefficients $K_i$ for the HPF calculation are, for example:

$$K_i = \{-1, -2, 6, -2, -1\} \text{ where } i = 0 \text{ to } 4$$

For example, K1 is a coefficient to be multiplied to a pixel in a coordinate of −2 (minus two) from a pixel in question in a horizontal direction, K2 is a coefficient to be multiplied to a pixel at a coordinate of −1 (minus one) from the pixel in question in the horizontal direction, and K3 is a coefficient to be multiplied to the pixel in question. In addition, for example, K4 is a coefficient to be multiplied to a pixel at a coordinate of +1 (plus one) from the pixel in question in the horizontal direction, and K5 is a coefficient to be multiplied to a pixel at a coordinate of +2 (plus two) from the pixel in question in the horizontal direction.

Figure 8:
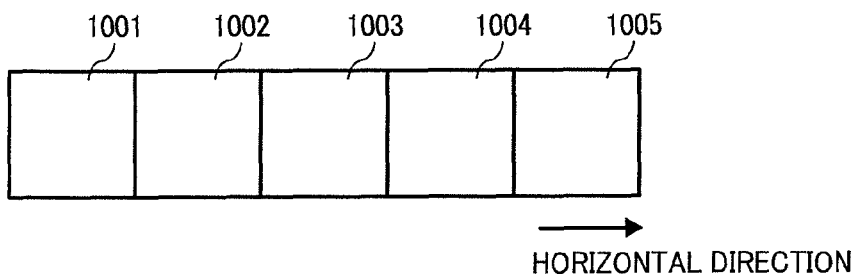
FIG. 8 shows how to calculate the AF evaluation value in the digital camera according to the first embodiment.

Referring to FIG. 8, the calculation of the AF evaluation value in the digital camera according to the first embodiment is described. Specifically, FIG. 8 illustrates five pixels in the AF evaluation value area. In the drawing, reference numeral 1001 denotes a pixel in a coordinate of −2 (minus two) from a pixel in question in the horizontal direction. Likewise, reference numeral 1002 denotes a pixel in a coordinate of −1 (minus one) from the pixel in question, reference numeral 1003 denotes the pixel in question, reference numeral 1004 denotes a pixel in a coordinate of +1 (plus one) from the pixel in question, and reference numeral 1005 denotes a pixel in a coordinate of +2 (plus two) in the pixel in question.

For example, an AF evaluation value is obtained by the following Formula 1:

$$AF \text{ evaluation value} = K1 \times C(1) + K2 \times C(2) + K3 \times C(3) + K4 \times C(4) + K5 \times C(5)$$

where C(1), C(2), C(3), C(4), and C(5) represent contrast values of the pixels 1001, 1002, 1003, 1004, and 1005, respectively.

A distance "a" between the subject and the focus lens is calculated on the basis of the calculated AF evaluation value by the following Formula 2 which is a deformed Gauss imaging equation of (1/a+1/b=1/f).

$$a = b \times f / (b - f)$$

where "b" is a distance between a focus lens and an imaging device, which is uniquely obtained from a position of the focus lens at which the AF evaluation value reaches peak. In addition, "f" is a focal length of the focus lens uniquely obtained from a zoom position at the shooting. By the Formula 2, the distance (distance information) between the subject and the focus lens is obtained for each of the AF evaluation value areas 101 in the angle of field 100.

Figure 6B:
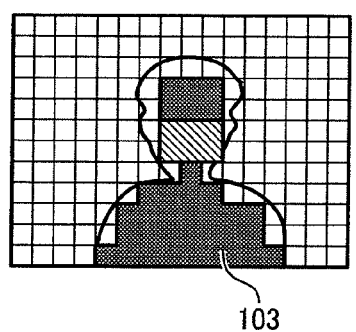
FIG. 6B shows another image processing of the digital camera according to the first embodiment.

Referring to FIG. 6A, reference numeral 102 denotes an AF (Auto Focus) area in which auto-focus is performed. The system controller 02 collectively determines, as a main subject block, the distance between the subject in the AF area and the focus lens (hereinafter referred to as a subject distance) and the AF evaluation value area within a predetermined distance range relative to the subject distance (step 01-004 in FIG. 5A). In FIG. 6B, reference numeral 103 denotes the main subject block which includes the AF area 102.

Figures 9, 10A:
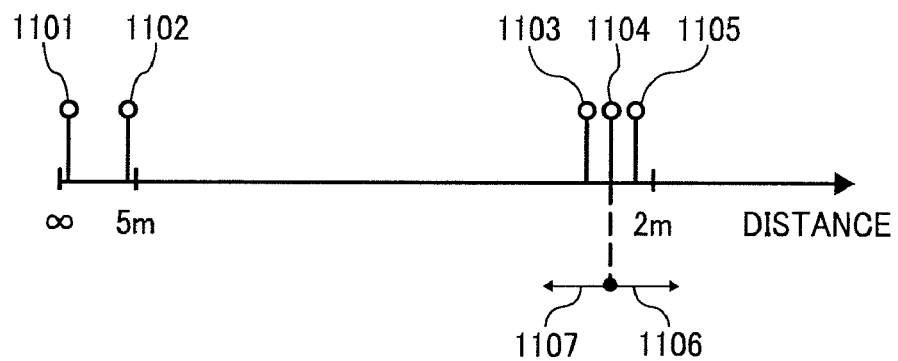
FIG. 9 shows the subject distance and a predetermined distance range in the digital camera according to the first embodiment.
FIG. 10A shows an example of filter coefficients in the digital camera according to the first embodiment.

Now, the subject distance and the predetermined distance range for deciding the main subject block will be described with reference to FIG. 9. In FIG. 9, a horizontal axis represents a distance from infinity toward a near distance. Reference numerals 1101-1105 denote the subject distances relative to the subject 105 in FIG. 6D obtained in the steps 01-002 and 01-003 in FIG. 5A. In addition, reference numeral 1101 denotes the subject distance relative to the mountain portion in the background, reference numeral 1102 denotes the subject distance relative to the curbstone 111 in the background 105, and reference numeral 1103 denotes the subject distance relative to a head portion of the person. Also, reference numeral 1104 denotes the subject distance relative to a face portion of the person, and reference numeral 1105 denotes the subject distance relative to a chest portion of the person.

As illustrated in FIG. 6A, the face portion of the person is the AF area 102, and the subject distance in the AF area 102 is equal to the subject distance 1104. In FIG. 9, reference numerals 1106 and 1107 denote a predetermined distance range to decide the main subject block. The reference numeral 1106 denotes a distance on a focus lens side, i.e., a near distance side, and the reference numeral 1107 denotes a distance on a subject, i.e., a long distance side. In FIG. 9, the subject distances 1103, 1104, and 1105 are included in the predetermined distance range. The area 103 in FIG. 6B is determined as the main subject block in the above-described manner.

The predetermined distance range 1106 and 1107 is, for example, set on the basis of the focal length of the focus lens and the subject distance of the AF area, referring to a table stored in the system controller 02. With a long focal length of the focus lens, the predetermined distance range is set to be short whereas with a short focal length of the focus lens, the predetermined distance range is set to be long. In addition, with a long subject distance in the AF area, the predetermined distance range is set to be long whereas with a short subject distance in the AF area, the predetermined distance range is set to be short.

Referring back to FIG. 5A, the system controller 02 calculates average luminance of image data in each of the pixels within the main subject block 103, and stores it (step 01-005). The system controller 02 also determines a main subject area on the basis of information on the obtained main subject block 103 and the captured image (step 01-006). The main subject area is determined by performing contour definition or contour extraction to determine an area including the main subject block 103.

Figure 6C:
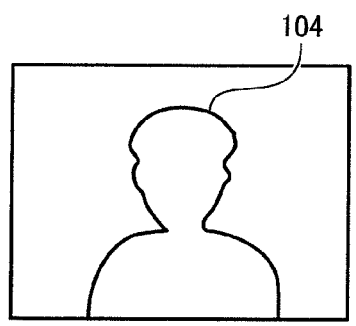
FIG. 6C shows yet another image processing of the digital camera according to the first embodiment.

FIG. 6C shows the main subject area 104. On the basis of information on the main subject area 104, the image processing section 04 sequentially performs an extraction processing to a main subject image, a blurring processing to a background image, and a synthesizing processing to the main subject image and a blurred background image (steps 01-007 to 01-009 in FIG. 5A). FIG. 6D shows a captured image 105, a main subject 106, an extracted main subject image 107, a background image 108, a blurred background image 109, and a synthesized image 110 of the main subject image 107 and the blurred background image 109.

In the extraction process of the main subject (step 01-007), a main subject is extracted from an image by separating the image along the main subject area 104. As a result, the captured image 105 is separated into the main subject image 107 and the background image 108.

In the blurring process of the background image (step 01-008), the background image 108 is subjected to the blur processing based on the blurring amount parameter, to generate the blurred background image 109.

Now, the blurring processing will be described in detail with reference to a flowchart in FIG. 5C. For example, the system controller 02 decides a level of processing in Table 1 according to the blurring amount parameter (step 03-001).

TABLE 1

<Processing Level based on Amount of Blurring>

| Blurring Amount (Bp) | Reduction Rate | Filter Type |
|---|---|---|
| 2-7 | None | A |
| 8-14 | 8/16 | A |
| 15-28 | 4/16 | A |
| 29-56 | 2/16 | B |
| 57-112 | 1/16 | B |

In Table 1, "Blurring Amount" represents values of the blurring amount parameter to determine a degree or magnitude of the blurring, in which the larger the value, the larger the effect of blurring. The "Reduction Rate" represents a reduction rate of the reduction processing, i.e., a ratio of length of one side of an image determined by the value of the blurring amount parameter. The "Filter Type" represents a type of filter (type A or type B) used in a later-described spatial filter processing, for example.

To attain a great blurring effect, an image is to be reduced in size before the spatial filtering process. In the reduction process, sampling is performed on an image by a bi-linear method so as to decrease the number of pixels thereof. In the present embodiment, the image reduction rate is determined from Table 1 and the system controller 02 corresponds to a reduction rate determiner part (reduction rate determining step).

For example, the blurring amount parameter is an integer value ranging from 2 to 112, and is equivalent to the number of pixels on a diameter of a blurred point image when a point image of one pixel is subjected to the blurring processing.

Further, a denominator of the reduction rate in the reduction processing is set to a value 16 which is a common divisor of a horizontal size and a vertical size of the image, for example, so that a reduced image size is not to be a value with a fraction equal to or less than an integer in both the horizontal and vertical directions. This can eliminate an error due to fraction rounding in the reduction or enlargement processing, and make the size of a reduced and enlarged image match with the image size of an original image accurately. Therefore, it is possible to improve image quality after the synthesizing processing, which will be described later in detail.

Figure 5B:
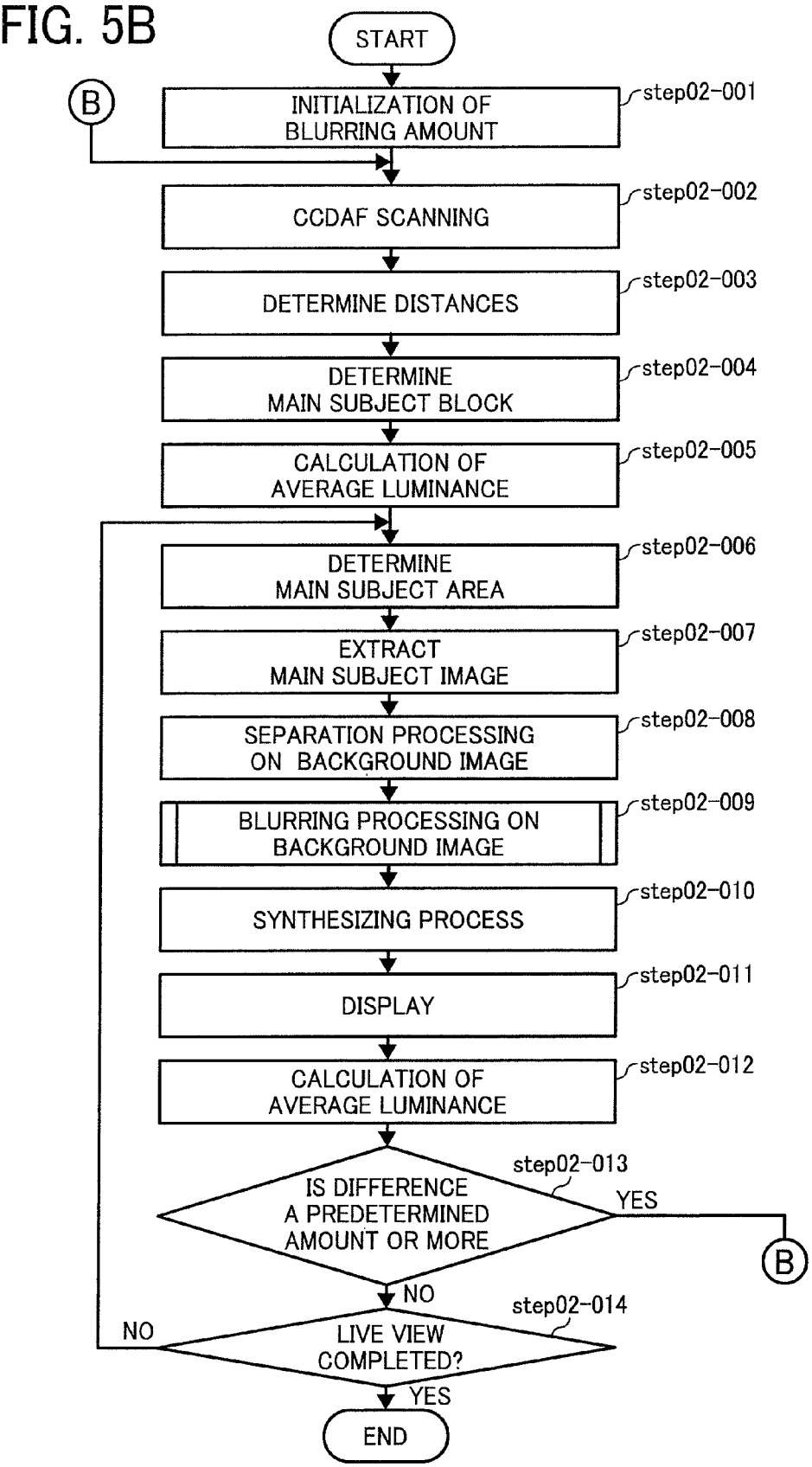
FIG. 5B is a flowchart for blurring processing of the digital camera according to the first embodiment.

When the value of the blurring amount parameter is equal to or less than a predetermined value, only the spatial filter processing is performed without the reduction processing (steps 03-002 and 03-003 in FIG. 5B). In the present embodiment, the spatial filter processing is executed by the image processing section 04 according to a setting of the system controller 02, and the spatial filter processing is to multiply an input image (In(x, y)) by a filter coefficient (k (ix, iy)) according to the following Formula 3, so as to obtain an output image (Out(x, y)).

$$\text{Out}(x, y) = \left( \sum_{iy=0}^{fs-1} \sum_{ix=0}^{fs-1} k(ix, iy) \text{In}(x + ix - fs/2, y + iy - fs/2) \right) / \sum_{iy=0}^{fs-1} \sum_{ix=0}^{fs-1} k(ix, iy)$$

Formula 3 where In represents an input image, Out represents an output image, k represents the filter coefficient, and fs represents a size of a filter. In the present embodiment, the filter size is 7, for example.

Further, fs in the above Formula 3 corresponds to the blurring amount parameter (blurring level) and is varied by 1 at a time in accordance with a manipulation of a user in a later described step 01-014. The blurring amount parameter is changed by a user's manipulation and is to control a magnitude of blurring amount (level of blurring effect).

In the Formula 3, the arithmetic results of the coordinate (x+ix-fs/2 and y+iy-fs/2) are to be rounded to an integer after the decimal point to indicate coordinates in the input image.

FIGS. 10A to 10D illustrate examples of the filter coefficients in the digital camera according to the first embodiment. FIG. 10A illustrates the filter coefficients with the blurring amount parameter being 2, to generate a blurring effect equivalent to the number of pixels on a diameter of a blurred image being 2. The number of pixels on the diameter of the blurred image is equivalent to a degree or level of a visual blurring effect, and the larger the blurring amount parameter, the larger the blurring effect generated. In FIGS. 10A to 10D, broken-line circles represent pixels to be a subject of the blurring processing. Similarly, FIG. 10B illustrates the filter coefficients with the blurring amount parameter being 7. The system controller 02 sets, for the blurring processing, a filter coefficient to such a value to allow the number of pixels on the diameter of an image to be equal to a value of the blurring amount parameter after the blurring processing.

When the blurring amount parameter is equal to or more than the predetermined amount, the image reduction part 04A (image reducing step) reduces an image in size to generate reduced image data, then the spatial filter processing part 04B (spatial filter processing step) performs the spatial filter processing on the image data to generate filter processed image data, and the image enlargement part 04C (image enlarging processing step) enlarges the size of the image data to the original size (steps 03-004 to 03-006). The enlargement processing enlarges the reduced image according to the inverse of the reduction rate in the step 03-004 to return the size of the reduced image to the original size. The enlargement processing is to perform sampling on an image by the bi-linear method in such a manner as to increase the number of pixels of the image. The enlarged image data is background image data subjected to the blurring processing.

The reduction processing, the spatial filter processing, and the expansion processing are executed by the image processing section 04 according to the setting of the system controller 02. Specifically, the image processing section 04 includes an image reduction part, a spatial filter processing part, and an image enlargement part. The filter coefficients for the blurring processing along with the reduction processing are set so that the number of pixels in a size (diameter) of the blurred portion is to be equal to a value of:

(Value of blurring amount parameter)×(Reduction rate)

FIG. 10C illustrates an example of the filter coefficients when the value of the blurring amount parameter is 28. Therein, from the Table 1, the number of pixels in the diameter of the blurred image is:

(28)×(4/16)=7

Figure 10D:
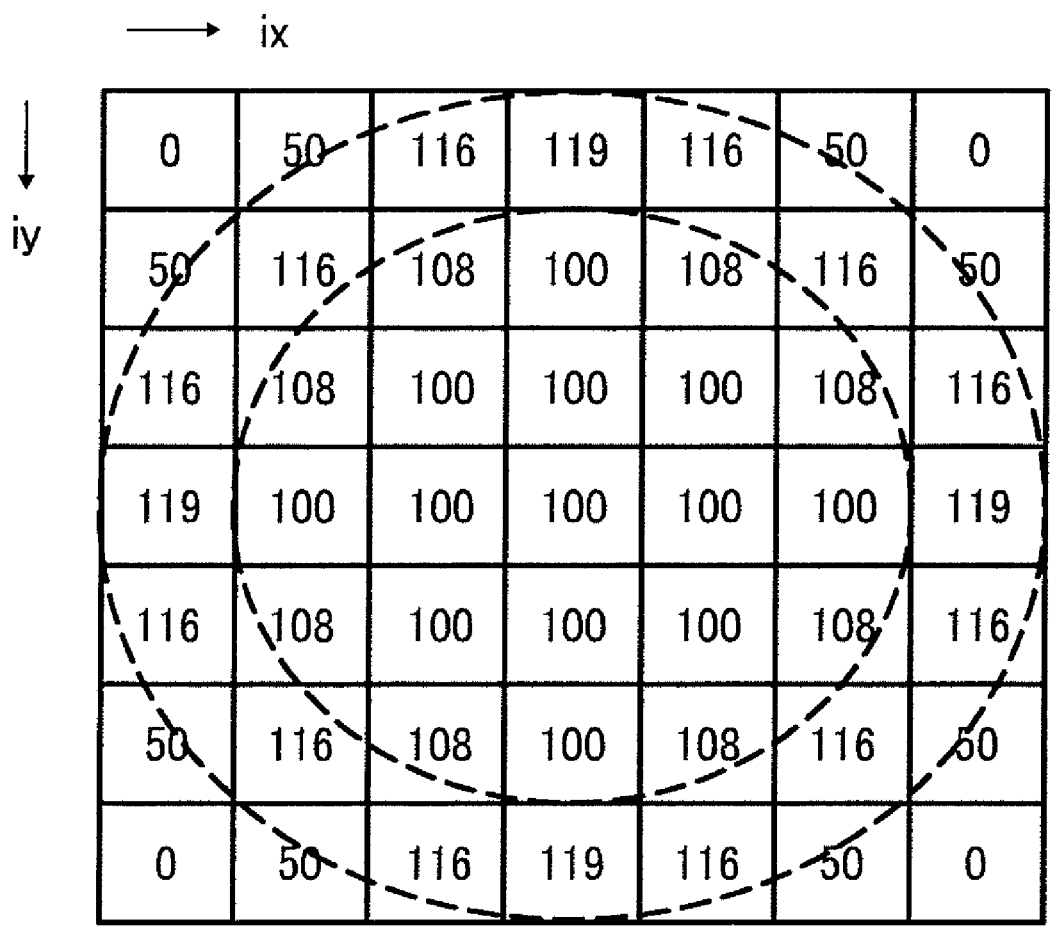
FIG. 10D shows further another example of the filter coefficients in the digital camera according to the first embodiment.

Now, the filter types of the spatial filter processing will be described. The filter coefficients in FIGS. 10A to 10C are of the filter type A. The filter coefficients in FIG. 10D are of the filter type B and they are values when the value of the blurring amount parameter is 56. Therein, from the Table 1, the number of pixels on a diameter of the blurred image is:

(56)×(2/16)=7

Thus, the number of pixels on the diameter of the blurred image in FIG. 10D is equal to the filter coefficients when the value of the blurring amount parameter is 28. However, in the filter type B in FIG. 10D, filter coefficients in a doughnut-like portion surrounded by two broken-line circles are set to larger values, making it possible to avoid deterioration in visibility of the image due to the reduction processing on the image. Thus, an overview of a subject before the blurring processing will remain in the blurred image since the blurring effect to the center portion of the image is set to weak. In other words, it is possible to realize the blurring effects equivalent to those of optical blurring.

Referring back to FIG. 5A, in the synthesizing processing (step 01-009), the blurred background image 109 is synthesized with the main subject image 107 to generate a synthesized image 110. The thus-generated synthesized image 110 is displayed on the LCD 06 through the display controlling section 05 (step 01-010).

This completes the processing for a live view image of one frame. At this point, the system controller 02 calculates average luminance of image data in each of the pixels within the main subject block 103 (step 01-011), and compares the calculated average luminance with the value calculated and stored in the step 01-005. With a difference of equal to or more than a predetermined value therebetween, the operation flow returns to the CCDAF scanning operation (step 01-012).

When a user changes the blurring amount, the blurring amount parameter is changed according to the change (steps 01-013 and 01-014), and the above-described processing is repeatedly executed from the step 01-006 to the completion of the live view operation (step 01-015). Upon the shutter button 62 being pressed down, the blurring processing similar to that in the steps 01-006 to 01-009 is performed on a captured image, to record the image with a blurred background. The blurring amount parameter therefor (at the time of shooting) is obtained, for example, by the following Formula 4 by correcting the blurring amount parameter for the live view image at a ratio of a horizontal image size (the number of pixels) of the captured image (background image) to a horizontal image size of the live view image.

(Blurring amount parameter at the time of shooting)=
(Blurring amount parameter for live view)×
(Horizontal image size of captured image)/(Horizontal image size of live view image)     Formula 4

In the Formula 4, the blurring amount parameter for the live view is multiplied by the ratio of the image sizes of the captured image and of the live view image to correct it to a proper value for shooting. That is, the blurring amount parameters for captured images in different image sizes can be calculated based on the blurring amount parameter suitable for the live view image. Hence, it is possible to obtain the images with proper blurring effect.

Second Embodiment

Next, a second embodiment of the present invention will be described with reference to FIG. 11. The second embodiment concerns changing an amount of blurring (blurring level) according to a focal position of the focus lens, a difference in a subject distance between a subject and a background portion in each area, and/or image size (number of pixels).

FIG. 5B is a flowchart for an operation of a digital camera (imaging apparatus) according to the second embodiment. In FIG. 11, steps 02-001 to 02-007 are the same as the steps 01-001 to 01-007 of FIG. 5A, so their description is omitted. In step 02-008, the image processing section 04 divides a background image into plural portions on the basis of subject distances.

FIG. 11 shows the division of the background image. It shows a captured image 200, a main subject 201, an extracted main subject image 202, a background image in a long distance 203, a background image in a short distance 204, a blurred background image in the long distance 205, a blurred background image in the short distance 206, and a synthesized image 207 of the main subject image 202, the blurred background image in the long distance 205, and the blurred background image 206 in the short distance. In the present embodiment, the image processing section 04 performs the blurring processing for each of the background images in the long and short distances 203, 204 in accordance with the blurring amount corresponding to the subject distance (step 02-009).

In the present embodiment, a blurring amount parameter Bp according to the subject distance is determined by the following Formula 5:

$Bp = K \times f \times |(a'-a)|/(a'a)$ (round up after the decimal point)
where a' represents the subject distance relative to the background (distance to background subject or background) as a subject of the blurring processing, "a" represents the subject distance relative to a subject in focus (distance to main subject), "f" represents a focal length of a focus lens, and "K" represents a coefficient determined by the number of pixels. One example of the coefficient K is 1.2×103 at the number of pixels being 640×480 and 2.4×103 at the number of pixels being 1280×960, however, it is not limited thereto.

The longer the focal length of a lens, the greater the blurring effect. Also, the larger the difference in subject distance between the subject in focus (main subject) and the background to be blurred, the greater the blurring effect. In such a blurring manner, it is possible to generate images with blurring effects equivalent to those by optical blurring. Note that at the blurring amount parameter being less than 2, there will be no blurring processing to be performed.

As in the first embodiment, the system controller 02 determines a reduction rate and a filter type from the Table 1 based on the blurring amount parameter Bp (by the reduction rate determiner part).

In the synthesizing processing (step 02-010), the blurred background image in the long distance 205 is synthesized with the blurred background image in the short distance 206, and then synthesized with the main subject image 202 to generate the synthesized image 207. Steps 02-011 to 02-013 of FIG. 5B are the same as the steps 01-010 to 01-012 of FIG. 5A, so their description is omitted.

The aforementioned embodiments have described an example where the blurring amount parameter is set using a live view image as a reference and is corrected for the blurring processing on the captured image according to the ratio of the horizontal image size of the captured image to that of the live view image. However, the blurring amount parameter can be set on the basis of the captured image, and can be calculated for the live view image by the following Formula 6.

(Blurring amount parameter for live view)=(Blurring amount parameter at the time of shooting)×
(Horizontal image size of live view image)/
(Horizontal image size of captured image)

Moreover, for a digital camera 01 having plural shooting modes for different image sizes, the blurring amount parameter may be set on the basis of the maximum image size, and the blurring amount parameter for the live view image may be calculated by the following Formula 7, and the same for the captured image may be calculated by the following Formula 8.

(Blurring amount parameter for live view)=(Blurring amount parameter for maximum image size)×
(Horizontal image size of live view image)/
(Horizontal image size of maximum captured image)     Formula 7

(Blurring amount parameter at the time of shooting)=
(Blurring amount parameter of maximum captured image size)×(Horizontal image size of captured image)/(Horizontal image size of maximum captured image)     Formula 8

Figure 5C:
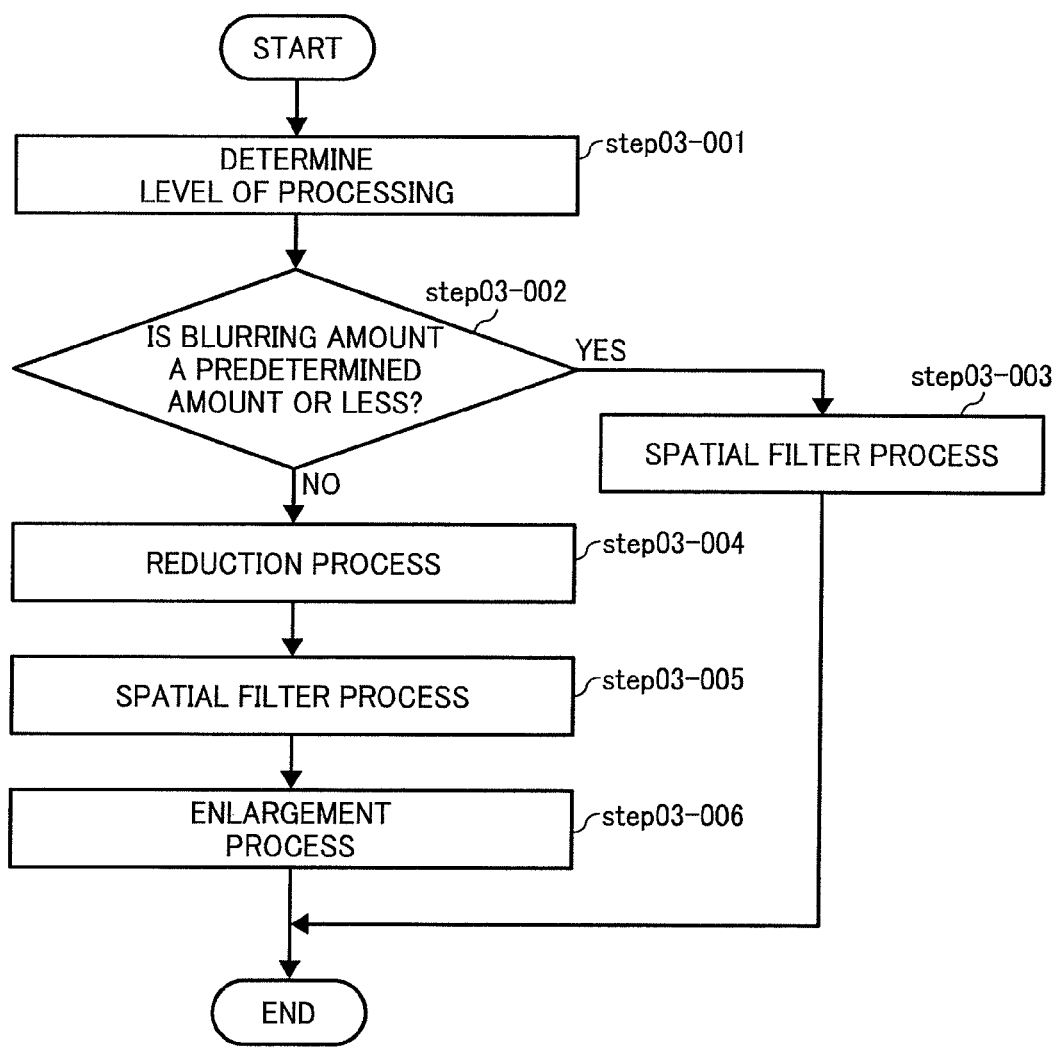
FIG. 5C is a flowchart of blurring processing of the digital camera according to the first embodiment.

Also in this case, it is able to change the spatial filter processing between one based on the corrected blurring amount parameter without the reduction processing and one after the reduction processing, as in the steps 03-002 to 03-006 of FIG. 5C.

Furthermore, the predetermined distance range for determining the main subject block is set based on the focal length of the lens and the subject distance in the AF area. Alternatively, the predetermined distance range can be corrected on the basis of the value of the blurring amount parameter by setting the predetermined distance range to a small value at a large blurring amount parameter and setting it to a large value at a small blurring amount parameter.

Further, according to the present invention, the blurring processing is configured to include the reduction processing, spatial filter processing, and enlargement processing. The reduction rate is determined according to at least one of a focal length of the lens system, a distance between the main subject image and the background image, a level of the blurring processing determined by a user's instruction, and an image size of the background image. With such a configuration, it is able to exert a great blurring effect on an image as much as that realized by an actual lens system.

According to the digital camera of the present invention, it is possible to perform the blur processing with a limited resource and attain a great blurring effect by a simple processing.

The image processor, the imaging apparatus including the same, and the image processing method according to the present invention can attain a great blurring effect by a simple processing.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present description or during the prosecution of the application, in which examples are to be construed as non-exclusive.

What is claimed is:

1. An image processor, comprising
an image processing section which performs a blurring processing on an image which is acquired via a lens system and includes an image of a main subject and an image of a background, the image processing section including:
a reduction rate determiner part which determines a reduction rate of the background image based on at least one of a focal length of the lens system, a distance between the main subject image and the background image, a level of the blurring processing determined by a user's instruction, and an image size of the background image;
an image reduction part which reduces the background image at the reduction rate determined by the reduction rate determiner part;
a spatial filter processing part which performs a spatial filter processing on the background image reduced by the image reduction part; and
an image enlargement part which enlarges the background image processed by the spatial filter processing part at an enlargement rate as an inverse of the reduction rate, wherein
a subject of the blurring processing of the image processing section is the background image.

2. An image processor according to claim 1, wherein:
said image further includes a subject image in a background; and
the background image is the subject image in a background.

3. An image processing method, comprising the steps of:
performing a blurring processing on an image which is acquired via a lens system and includes an image of a main subject and an image of a background;
determining a reduction rate of the background image based on at least one of a focal length of the lens system, a distance between the main subject and the background, a level of the blurring processing determined by a user's instruction, and an image size of the background image;
reducing the background image at the reduction rate determined in the reduction rate determining step;
performing a spatial filter processing on the background image reduced in the image reducing step; and
enlarging the background image processed in the spatial filter processing step at an enlargement rate as an inverse of the reduction rate, wherein
a subject of the blurring processing is the background image.

4. The image processing method according to claim 3, wherein
said image further includes a subject image in a background; and
the background image is the subject image in a background.

5. An imaging apparatus, comprising the image processor according to claim 1.

6. An imaging apparatus, comprising the image processor according to claim 2.

* * * * *